UNITED STATES PATENT OFFICE.

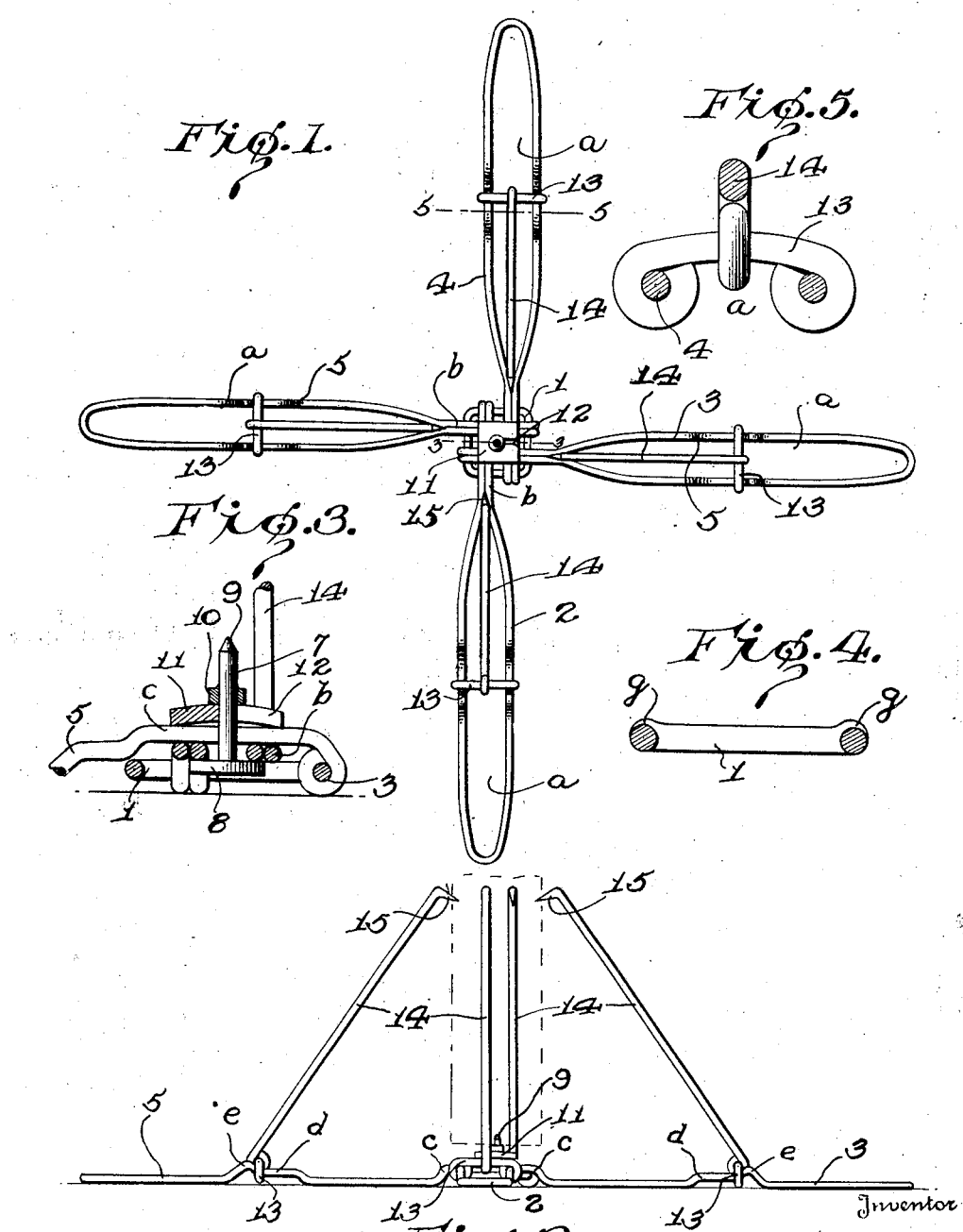

WILLIAM W. FERGUSON, OF NEW HAVEN, CONNECTICUT.

TREE-HOLDER.

1,333,480.  Specification of Letters Patent.  Patented Mar. 9, 1920.

Application filed July 10, 1919. Serial No. 309,957.

*To all whom it may concern:*

Be it known that I, WILLIAM W. FERGUSON, a citizen of the United States, residing at New Haven, in the county of New Haven and State of Connecticut, have invented a new and useful Tree-Holder, of which the following is a specification.

The present invention is a tree support or holder, particularly designed to support Christmas trees of varying heights and diameters, but which may also provide a base for pole-like members of various descriptions or for similar purposes.

It is the object of the invention to produce a device of the above character which is primarily cheap and easy to manufacture, while at the same time is highly efficient for its purposes.

Other objects and features of the invention reside in the sundry details of construction, combination and arrangement of parts hereinafter fully described and pointed out in the appended claims.

In the drawings which illustrate the invention in its preferred forms, as at present devised:

Figure 1, is a plan view of the invention,

Fig. 2 is a side elevation of the invention as shown in Fig. 1 and illustrating in dotted line a tree supported thereby, Fig. 3 is an enlarged fragmentary detail view taken on line 3 of Fig. 1, Fig. 4 is an enlarged sectional view of the central connecting member, Fig. 5 is an enlarged detailed view taken on line 5 of Fig. 1.

Referring in detail to the embodiment shown in Figs. 1 to 5, the holder comprises a central connecting member 1, preferably a hollow square of stout wire, having laterally extending base members 2, 3, 4, and 5 hingedly connected thereto. Each base member is formed of wire bent upon itself to provide an elongated loop $a$ and having its ends brought together in juxta-relation, as shown at $b$, to provide a reduced extension from the loop, having its extremity bent around the central member 1 to form a hinged connection therewith, as at 6. The loops $a$ are preferably of considerable width to provide a firm supporting base, and to lie in the same horizontal plane. In practice, at least three base members should be used, but in the present instance four are shown, each one having a hinged connection 6 with one side of the square central member 1, respectively.

In the extended position of the holder the members 2 and 4 are arranged to extend in opposite directions having their portions $b$ resting on the side of the central member opposite their respective hinged connections 6, and the members 3 and 5 are arranged similarly in opposite directions and have their reduced portions $b$ resting over the reduced portions of the members 2 and 4, the portions $b$ of the members 3 and 5 being offset as indicated at $c$ (Fig. 3) to allow for this overlapping. The loop portions $a$ and the hinged portions 3 of the base members all lie in the same horizontal plane in order to provide a flat and even base surface for the holder.

To maintain the base members in their extended position, as shown, a stud 7 is inserted through the member 1 and between the portions $b$ of the base members in such manner that the head 8 of the stud engages the underside of said portions of the members 2 and 4, and its other or pointed end 9 projects upwardly to penetrate the upper end of the tree or the like. This projecting end of the stud has a collar 10 rigid thereon, by swaging or other means, at a distance below the penetrating point 9; or it may be otherwise provided with a shoulder under which a locking key or wedge 11 engages. This wedge, preferably, consists of a concavo-convex washer-like member, having an elongated slot 12 therein extending inwardly from one edge thereof to receive the shank of the stud in order that it may be slid in position between the portions $b$ of the base members 3 and 5 and the collar 10, the concave side engaging the portions $b$ while the convex face engages under the shoulder or collar 10, whereby a wedging action is produced between said parts to hold the members rigidly in position.

The loop portion of each of the base members is upwardly offset at intermediate points $d$ to form guides on opposite sides thereof on which links 13, preferably of wire and bent around the guides (Fig. 5), are slidably mounted. Each of these links has pivoted to an intermediate portion thereof a brace arm 14, also of stout wire. The upper ends of the brace arms are provided with lateral extending points or spikes 15 adapted to be extended into the trunk of a tree at a point above the base members in order to afford lateral support for the tree. The outer movement of the links on the guides $d$ is positively limited by stops *e* which are bent from the base members and rise above the guide, as can be observed from Fig. 2. The central member 1 also has raised portions *g* at its corners in order to provide stops for preventing the base members from sliding out of their normally arranged position.

The holder, according to this embodiment may be collapsed to occupy a small amount of space by removing the key 11 and the stud 7 so that the base members may be moved to lie substantially parallel and in juxta-relation.

Obviously this embodiment presents an extremely cheap and strong construction, as there are very few parts to be assembled, and their manufacture can be wholly accomplished by stamping operations.

Having thus fully described the preferred embodiments of the invention, it is to be understood that certain changes in the construction, combination and arrangement of parts, as herein shown and described, may be made which fall within the legitimate scope of the appended claims.

What is claimed is:

1. A device of the character described comprising a central member, base members hingedly connected to the central member and extending radially therefrom, means for maintaining said base members rigid with respect to each other, and braces, one secured to each of said base members and provided with means to penetrate the trunk of a tree.

2. A device of the character described comprising radially extending base members having their inner ends overlapping, a stud extending between said members and having a head engaging under the lower-most of said ends, means on the other end of said stud engaging the uppermost ends of said members, whereby the latter are maintained in rigid position relative to each other, and means extending from said base members for laterally supporting the tree.

3. A holder comprising radially extending base members having their inner ends overlapping, a stud extending between said members and having a head engaging the lower-most of said ends, a removable wedge element between a shoulder on the stud and the upper most of said ends, whereby the latter are maintained in rigid position relative to each other, and braces, one secured to each of said base members and provided with means to penetrate the trunk of the tree to offer lateral support thereto.

4. A device of the character described comprising a central member, base members formed of wire bent to provide loop portions having reduced inner end portions secured to the central member, a stud extending between said reduced end portions and having a head engaging certain of said reduced portions, a key adapted to engage between a shoulder on the stud and certain other of said reduced portions for maintaining the base members in rigid position relative to each other, and a brace arm for each of said base members and having one end connected thereto, the other ends of said brace arms being engageable with the trunk of the tree at a point above the base members to laterally support the tree.

5. A device of the character described comprising a central connecting member, radially disposed base members each consisting of elongated loops, opposing base members having their inner ends connected to opposite sides of said connecting member, a stud passing upwardly between the inner ends of the base members and having a head engaging the lower-most ends, means on the upper end of the stud engaging the uppermost ends of the base member to hold said parts in rigid relation, and a brace arm for each base member and having one end thereof pivotally connected to an intermediate portion of the base member, the opposite ends of said arms being engageable with the tree trunk above the base members to laterally support the tree.

6. A device of the character described comprising a central connecting member, radially disposed base members, each formed of a wire bent to provide an elongated loop having its end portions brought together to form an extension, opposing base members having the inner ends of said extensions pivotally connected to opposite sides of said connecting member, a stud passing upwardly between said ends of the base members and having a head thereon engaging the lower-most ends of said members, and a removable wedge element engaging between a shoulder on the stud and the uppermost ends of said base members to hold the latter rigidly in extended position relative to the connecting member, the upper extremity of said stud having a penetrating point, a brace arm for each base member and having one end thereof pivotally connected to an intermediate portion of the base member, the opposite ends of said arms having penetrating points to engage the tree trunk at a distance above the base member.

In testimony whereof I have hereunto set my hand.

WILLIAM W. FERGUSON.